(12) United States Patent
Ogino

(10) Patent No.: US 8,639,105 B2
(45) Date of Patent: *Jan. 28, 2014

(54) IMAGING APPARATUS HAVING AUTOFOCUS FUNCTION, AND CONTROL METHOD FOR THE IMAGING APPARATUS

(71) Applicant: Canon Kabushiki Kaisha, Tokyo (JP)

(72) Inventor: Hiroyuki Ogino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/780,219

(22) Filed: Feb. 28, 2013

(65) Prior Publication Data

US 2013/0176473 A1    Jul. 11, 2013

Related U.S. Application Data

(63) Continuation of application No. 12/854,437, filed on Aug. 11, 2010, now Pat. No. 8,412,035.

(30) Foreign Application Priority Data

Aug. 18, 2009   (JP) ................................. 2009-189562

(51) Int. Cl.
  *G03B 3/10*   (2006.01)
  *G03B 13/34*  (2006.01)

(52) U.S. Cl.
  USPC ........... 396/124; 396/121; 396/128; 348/348; 250/201.8

(58) Field of Classification Search
  USPC .......... 396/124, 121, 123, 125–128; 348/345, 348/349, 350, 352–356; 250/201.2, 201.4, 250/201.6, 201.7, 201.8
  See application file for complete search history.

(56) References Cited

U.S. PATENT DOCUMENTS 8,412,035 B2 *    4/2013   Ogino ........................... 396/124
2009/0244315 A1 * 10/2009  Miura et al. ................. 348/222.1

FOREIGN PATENT DOCUMENTS

JP   2002277726 A *   9/2002   ............... G02B 7/28

* cited by examiner

*Primary Examiner* — Rochelle-Ann J Blackman

(74) *Attorney, Agent, or Firm* — Canon USA, Inc. IP Division

(57) ABSTRACT

An apparatus includes an imaging unit, a focus detection unit configured to detect a focusing state of a focus lens, a designation unit configured to receive a designation of an in-screen position of an object displayed on a display screen, and a control unit configured to control a movable range of the focus lens when the focusing state is detected by the focus detection unit such that if the designation unit does not designate the in-screen position of the object, the movable range is set to be a first range and, if the designation unit designates the in-screen position of the object, the movable range is set to a second range that is wider than the first range.

4 Claims, 11 Drawing Sheets

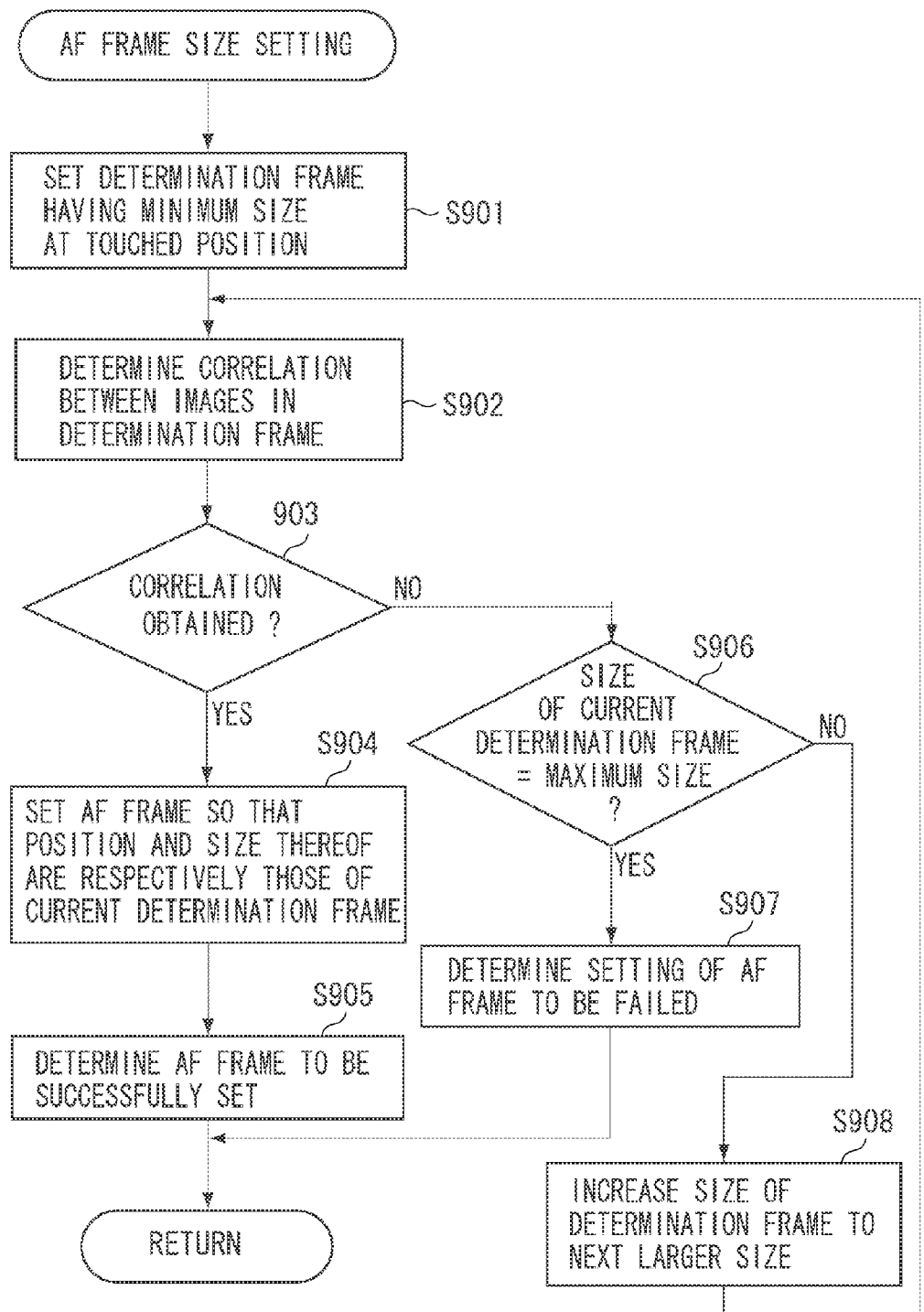

IMAGING APPARATUS HAVING AUTOFOCUS FUNCTION, AND CONTROL METHOD FOR THE IMAGING APPARATUS

CROSS-REFERENCE TO RELATED APPLICATION

This application is a Continuation of U.S. application Ser. No. 12/854,437, filed Aug. 11, 2010, which claims priority from Japanese Patent Application No. Japanese Patent Application No. 2009-189562 filed Aug. 18, 2009, which are hereby incorporated by reference herein in their entireties.

BACKGROUND OF THE INVENTION

1. Field of the Invention

The present invention relates to an imaging apparatus and a control method therefor. More particularly, the present invention relates to techniques suitable for use with an imaging apparatus having an autofocus function.

2. Description of the Related Art

Hitherto, electronic still cameras and video cameras have used, when performing autofocus control processing (hereinafter referred to as AF), methods for setting, as an in-focus position, a position of a focus lens, at which a high-frequency component of a luminance signal obtained from an image sensor such as a charge-coupled device (CCD) is maximized. The above methods include a known hill-climbing method that moves a focus lens in a direction in which a level of a high-frequency component (hereinafter referred to as a focus evaluation value) obtained from an image sensor increases, and that sets, as an in-focus position, a position of the focus lens, at which the level of a high-frequency component of a luminance signal obtained from an image sensor is maximized. A scan method is also known, which stores focus evaluation values while a focus lens is driven over the entire movable range thereof and which sets, as an in-focus position, a position of the focus lens that corresponds to a maximum one of the stored focus evaluation values.

There has been a method for performing, when such AF is performed, a focusing operation by dividing a movable range of a focus lens. Japanese Patent Application Laid-Open No. 2002-277726 discusses a method for performing focus adjustment by dividing a scan range into first and second regions and moving the lens in a normal still image photographing mode in one of the first and second regions, while the lens is moved in a specific operation mode in all the regions.

The above Japanese Patent Application Laid-Open No. 2002-277726 does not discuss a focus detection region (referred to also as an AF frame), in which a focus evaluation value is detected, in a photographing image plane in a focus adjustment apparatus proposed therein. However, there are various objects of varied sizes to be photographed. Accordingly, when the size of the AF frame is set to be constant for any object, the AF frame is too large for a small object. Thus, something, such as a background, other than the object may come into the AF frame. Consequently, a distance to the object may erroneously be measured. On the other hand, when the AF frame is too small for a large object, sufficient contrast is not obtained in the AF frame. Thus, a distance to the object may erroneously be measured.

SUMMARY OF THE INVENTION

According to an aspect of the present invention, an apparatus includes an imaging unit configured to perform photoelectric conversion on object light incident thereon via a focus lens to acquire an image signal, a focus detection unit configured to detect a focusing state of the focus lens based on the image signal acquired while the focus lens is moved, a designation unit configured to receive a designation of an in-screen position of an object displayed on a display screen, and a control unit configured to control a movable range of the focus lens when the focusing state is detected such that if the designation unit does not designate the in-screen position of the object, the movable range is set to a first range and, if the designation unit designates the in-screen position of the object, the movable range is set to a second range that is wider than the first range.

According to another aspect of the present invention, a method for controlling an apparatus configured to perform photoelectric conversion on object light incident thereon via a focus lens to acquire an image signal. The method includes detecting a focusing state of the focus lens based on the image signal acquired while the focus lens is moved, receiving a designation of an in-screen position of an object displayed on a display screen, and controlling a movable range of the focus lens when the focusing state is detected such that if the in-screen position of the object is not designated, the movable range is set to a first range and, if the in-screen position of the object is designated, the movable range is set to a second range that is wider than the first range.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 is a flowchart illustrating an AF frame size setting process performed in the pre-photographing AF determination process illustrated in FIG. 5.

DESCRIPTION OF THE EMBODIMENTS

Various exemplary embodiments, features, and aspects of the invention will be described in detail below with reference to the drawings.

Figure 1:
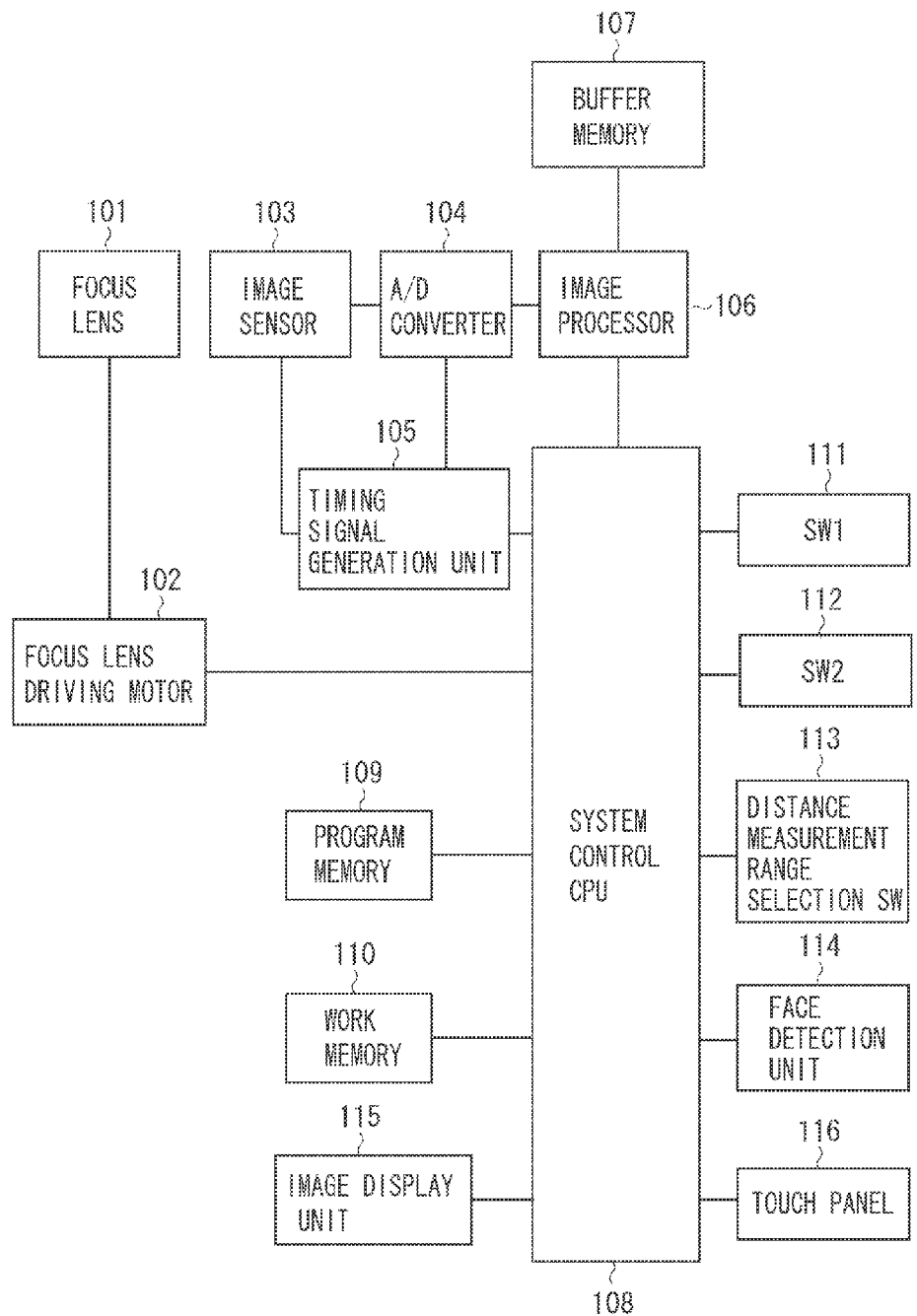
FIG. 1 is a block diagram illustrating a configuration of an electronic camera according to an exemplary embodiment of the present invention.

FIG. 1 is a block diagram illustrating a configuration of an electronic camera according to an exemplary embodiment of the present invention. Referring to FIG. 1, a focus lens 101 performs focus adjustment so that an object image is in focus on an image sensor to be described below. A focus lens driving motor 102 moves the focus lens 101. An image sensor 103 converts reflection light from an object into an electrical signal. Thus, object-image light incident on the image sensor 103 via the focus lens 101 is subjected to photoelectric conversion and converted into an electrical signal. An analog-to-digital (A/D) converter 104 converts into a digital signal an analog signal output from the image sensor 103.

A timing signal generation unit (hereinafter referred to as TG) 105 generates a timing signal to cause the image sensor 103 and the A/D converter 104 to operate. An image processor 106 performs predetermined processing on image data input from the A/D converter 104. A buffer memory 107 temporarily stores image data processed by the image processor 106.

A micro-controller (hereinafter referred to as a central processing unit (CPU)) 108 controls the entire system, e.g., the entire photographing sequence. A program memory 109 stores programs to be executed in the CPU 108. The CPU 108 writes and reads various data to and from a work memory 110 when performing processing according to the program stored in the program memory 109.

A photographing-preparation instruction switch (hereinafter referred to as SW1) 111 is operated to instruct the camera to perform photographing-preparation such as AF and automatic exposure control processing (hereinafter referred to as AE). A photographing instruction switch (hereinafter referred to as SW2) 112 is operated to instruct, after the SW1 is operated, the camera to perform a photographing process including main-exposure and recording operations. A selection switch 113 selects a movable range of the focus lens 101 to select a desired one of a plurality of regions into which a focusable range is divided. A face detection unit 114 detects a face from an image represented by image signals to be obtained by imaging. An image display unit 115 displays an image.

An operator touches a touch panel 116 with a finger or a pen tip to instruct (i.e., the operator gives instructions to) the camera to perform various types of operations and settings. The touch panel 116 is set to be overlapped on the image display unit 115. It is assumed that positions on the touch panel 116 correspond one-to-one to those on a display screen of the image display unit 115. In the following description, an operation of touching a position on the touch panel 116, which corresponds to an image or an icon displayed on the screen of the display unit 115, is expressed simply as "touching an image" or "touching an icon".

Figure 2:
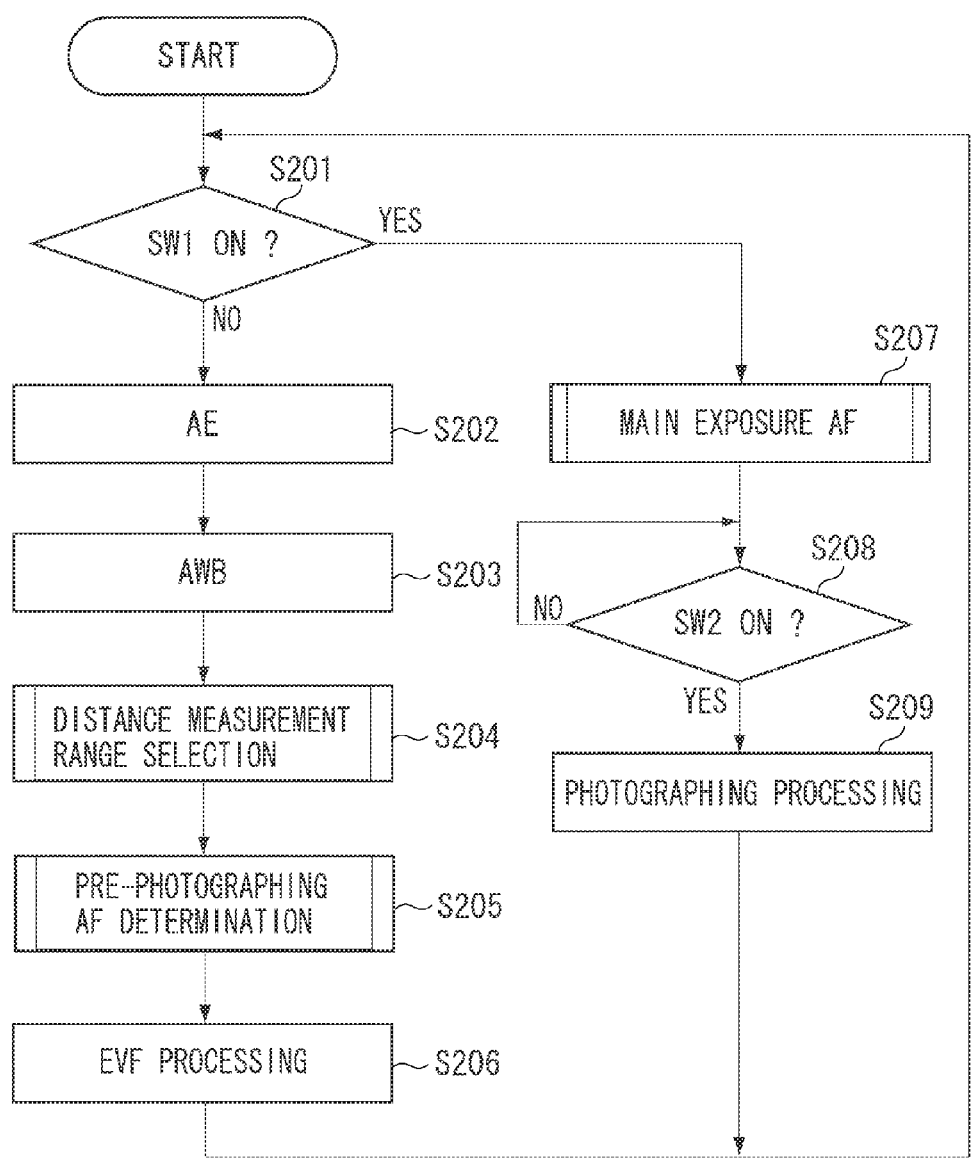
FIG. 2 is a flowchart illustrating a fundamental operation of the electronic camera.

Next, the electronic camera according to the present embodiment is described hereinafter with reference to the flowchart illustrated in FIG. 2. Operations in a process illustrated in FIG. 2 are controlled by the system control CPU 108. First, in step S201, the system control CPU 108 determines which of ON-state and OFF-state a state of the SW1 for instructing photographing-preparation is. If the SW1 is in ON-state (YES in step S201), the process proceeds to step S207. Otherwise (NO in step S201), the process proceeds to step S202. In step S202, the CPU 108 controls a diaphragm (not shown) and a shutter speed to perform AE so that the luminance of an image to be displayed on the screen of the image display unit 115 is appropriate. Then, in step S203, the CPU 108 causes the camera to perform automatic white balance control processing (hereinafter referred to as AWB) so that the image to be displayed on the screen of the image display unit 115 has an appropriate color balance, regardless of the color temperature of a light source.

Next, in step S204, the CPU 108 performs the selection of a movable range of the focus lens 101 according to a procedure described below. Then, in step S205, the CPU 108 determines whether a pre-photographing AF operation is performed according to the procedure described below. In step S206, the CPU 108 causes the image processor 106 to perform predetermined processing (e.g., electronic viewfinder processing (hereinafter referred to as EVF processing)) on image signals read from the image sensor 103. Next, the CPU 108 causes the image display unit 115 to display an image represented by the processed image signals. After that, the process returns to step S201. Then, the camera performs the above process.

On the other hand, in step S207, the camera performs a main exposure AF operation according to the procedure described below. Then, in step S208, the CPU 108 determines which of ON-state and OFF-state the state of the SW2 for instructing photographing is. If the state of the SW2 is ON-state (YES in step S208), the process proceeds to step S209. Next, in step S209, the CPU 108 causes the camera to perform photographing processing including exposure to the image sensor 103, reading of data therefrom, image processing to be performed by the image processor 106, and recording of processed data on a recording medium (not shown).

Figure 3:
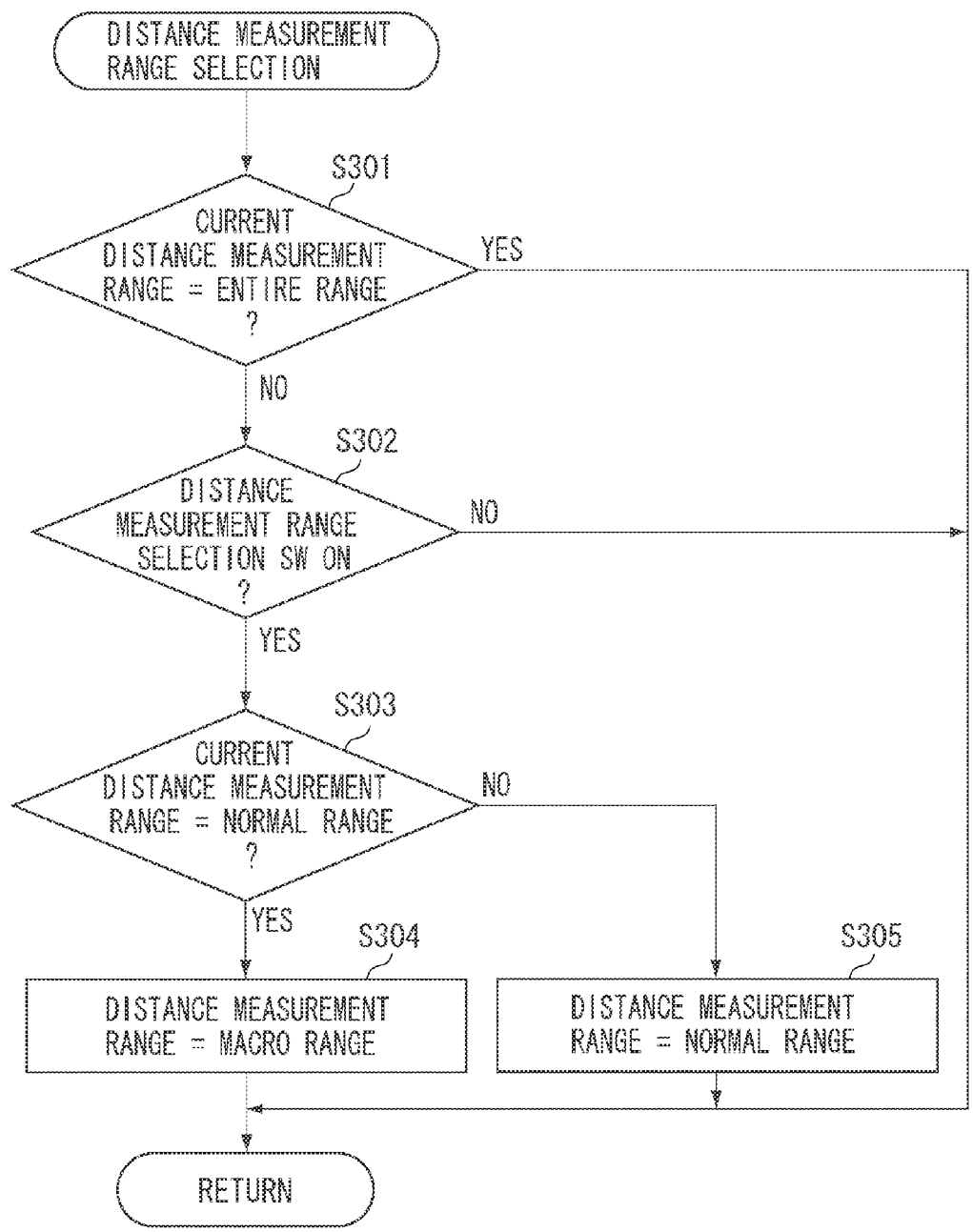
FIG. 3 is a flowchart illustrating a process of selecting a movable range of a focus lens, which is performed in the fundamental operation illustrated in FIG. 2.

FIG. 3 is a flowchart illustrating a process of selecting a movable range of the focus lens 101, which is performed in step S204 illustrated in FIG. 2. The movable range of the focus lens 101 is assumed to be preliminarily set by initialization processing (not illustrated) to be a normal range. An operation illustrated in FIG. 3 is controlled by the system control CPU 108.

First, in step S301, the CPU 108 determines whether a current movable range of the focus lens 101 is the entire range. If the current movable range of the focus lens 101 is the entire range (YES in step S301), the CPU 108 finishes the present process. Otherwise (NO in step S301), the process proceeds to step S302. In step S302, the CPU 108 determines which of ON-state and OFF-state the state of the movable range selection switch 113 is. If the state of the switch 113 is ON-state (YES in step S302), the process proceeds to state S303. Otherwise (NO in step S302), the CPU 108 finishes the present process. In step S303, the CPU 108 determines whether the current movable range of the focus lens 101 is the normal range. If the movable range of the focus lens 101 is the normal range (YES in step S303), the process proceeds to step S304. Otherwise (NO in step S304), the process proceeds to step S305.

Figure 4:
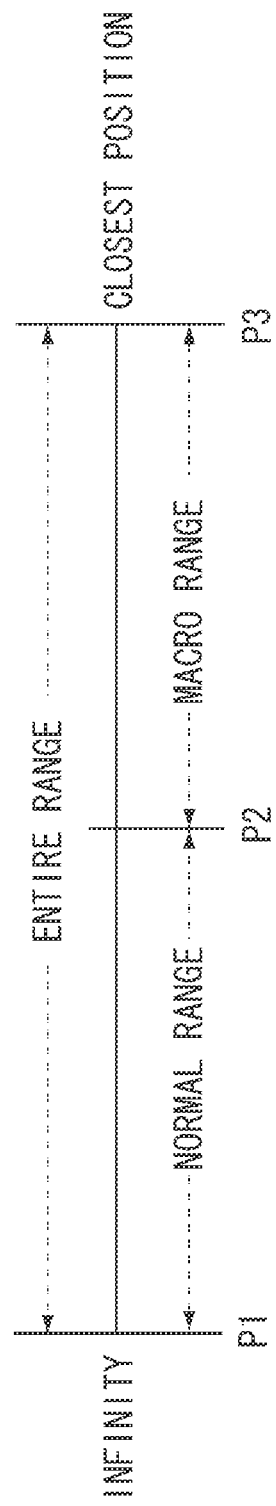
FIG. 4 is a diagram illustrating the movable range of the focus lens, which is selected in the process illustrated in FIG. 3.

In step S304, the CPU 108 sets the movable range of the focus lens 101 to be a macro range. In step S305, the CPU 108 sets the movable range of the focus lens 101 to the normal range. FIG. 4 illustrates the relationship among the entire range, the normal range, and the macro range. In an ordinary photographing mode, the CPU 108 causes the lens to move in one of the normal range and the macro range. In a specific operation mode described below, the CPU 108 performs focus adjustment by causing the lens to move in the entire range. The normal range extends from infinity (position P1) to a position P2 located at a predetermined object-distance (e.g., 50 centimeters (cm)) from a photographing object. The macro range extends from the position P2 located at the predetermined object-distance to the position P3 at a closest object-distance (e.g., 5 cm), at which focus adjustment can be achieved. The entire range is the combination of the normal range and the macro range. According to the present embodiment, it is assumed that in a focusable range, a range limited to a long-distance side (corresponding to positions P1 through P2) or to a short-distance side (corresponding to positions P2 through P3) is set to be a first range, and that the entire focusable range is set to be a second range.

Figure 5:
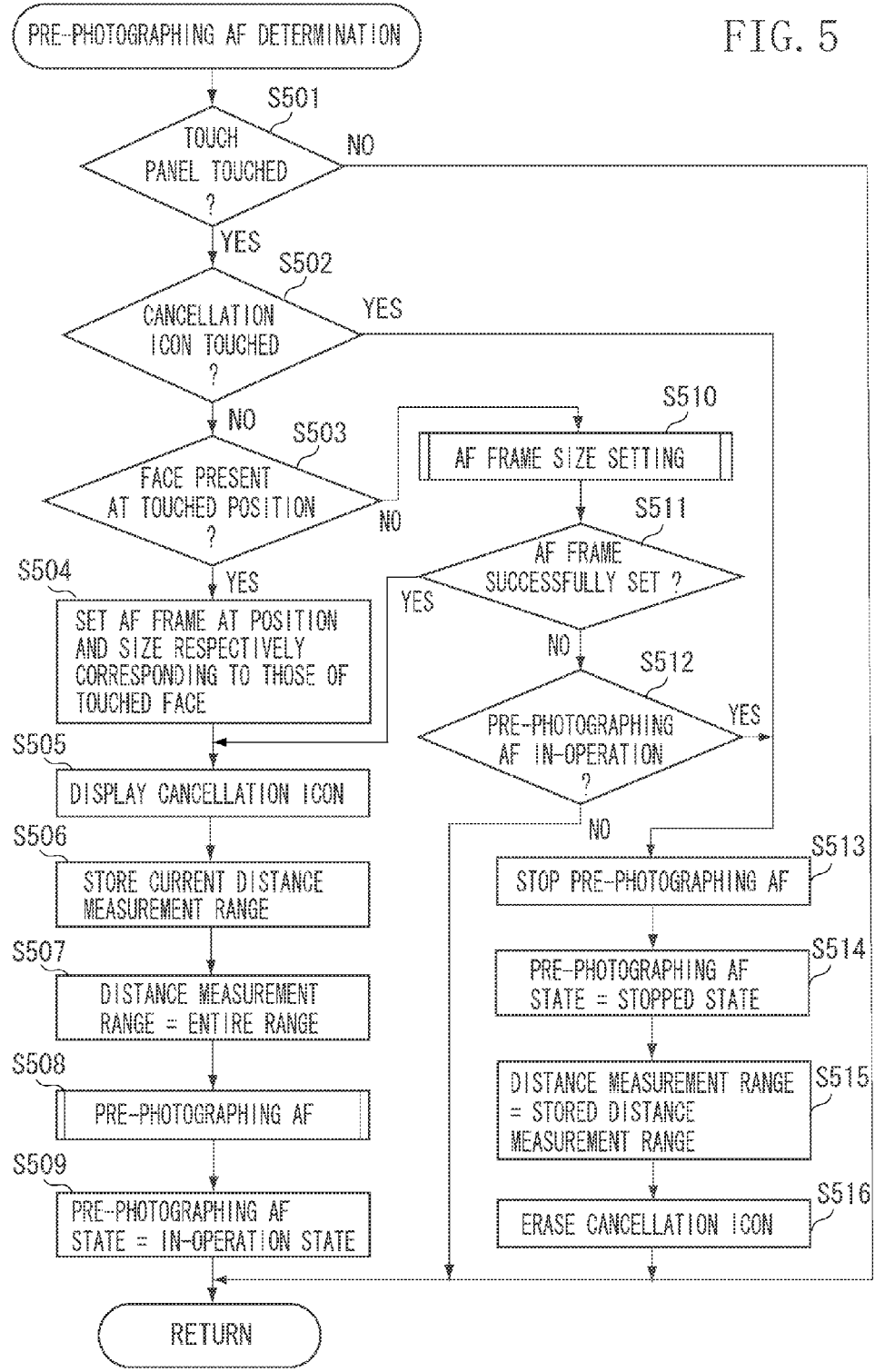
FIG. 5 is a flowchart illustrating a pre-photographing AF determination process performed in the fundamental operation illustrated in FIG. 2.

FIG. 5 is a flowchart illustrating the pre-photographing AF determination process performed in step S205 illustrated in FIG. 2. An operation illustrated in FIG. 5 is controlled by the system control CPU 108.

First, in step S501, the CPU 108 determines whether an operator touches the touch panel 116. If the operator touches the touch panel 116 (YES in step S501), the process proceeds to step S502. Otherwise (NO in step S501), the CPU 108 finishes the present process. In step S502, the CPU 108 determines whether the operator touches a cancellation icon to issue a cancellation instruction. If the operator touches the cancellation icon (YES in step S502), the process proceeds to step S513. Otherwise (NO in step S502), the process proceeds to step S503. The cancellation icon is assumed to be preliminarily erased in initialization processing (not illustrated). According to the present embodiment, if a cancellation instruction is issued, the driving range of the focus lens 101 is set to the first range.

In step S503, the CPU 108 determines whether a face is displayed at a position on the screen of the image display unit 115, which corresponds to the position touched in step S501. The determination on whether a face is displayed thereat is made from an image processed by the image processor 106, based on the position and the size of the face detected by the face detection unit 114. If it is found, as a result of the determination, that a face is displayed thereat (YES in step S503), the process proceeds to step S504, in which the CPU 108 sets an AF frame for detecting a focus according to the position and the size of the face. On the other hand, if no face is displayed thereat (NO in step S503), the process proceeds to step S510, in which the CPU 108 sets the position and the size of an AF frame based on the degree of the correlation between object images at the touched position, which are photographed at different points of time. Accordingly, the movable range of the focus lens 101 can be changed between a moment at which the screen is touched and another moment at which the screen is not touched.

In step S504, the CPU 108 sets an AF frame at the position and the size, which respectively correspond to those of the face touched in step S501. Simultaneously with the setting of the AF frame, the CPU 108 causes the image display unit 115 to display an AF frame at the position and the size, which respectively correspond to those of the face. Next, in step S505, the CPU 108 causes the image display unit 115 to display a cancellation icon. Then, in step S506, the CPU 108 stores the current movable range of the focus lens 101. The movable range of the focus lens 101 is selected in the above process of selecting the movable range of the focus lens 101, which is illustrated in FIG. 3. One of the normal range and the macro range is set as the movable range of the focus lens 101.

Next, in step S507, the CPU 108 sets the movable range of the focus lens 101 to be the entire range. In step S508, the CPU 108 performs a pre-photographing AF process according to a procedure described below. In step S509, the CPU 108 sets a pre-photographing AF state to be an in-operation state, and stores the pre-photographing AF state in the work memory 110. The pre-photographing AF state is assumed to be preliminarily set, while the pre-photographing AF process is stopped, in the initialization processing (not illustrated).

On the other hand, in step S510, to which the pre-photographing AF determination process proceeds, as a result of determining, in step S503, that no face is displayed thereat, the CPU 108 performs AF frame size setting processing according to a procedure described below. Then, in step S511, the CPU 108 determines whether an AF frame is successfully set in the AF frame size setting processing in step S510. If the AF frame is successfully set (YES in step S511), the pre-photographing AF determination process proceeds to step S505. Otherwise (NO in step S511), the pre-photographing AF determination process proceeds to step S512.

In step S512, the CPU 108 determines the pre-photographing AF state set in step S509 or S514 to be described below. If the pre-photographing AF state is an in-operation state (YES in step S512), the pre-photographing AF determination process proceeds to step S513. Otherwise (NO in step S512), the CPU 108 finishes the present process. In step S513, the CPU 108 stops the pre-photographing AF process. In step S514, the CPU 108 sets the pre-photographing AF state to be a stopped state. In addition, the CPU 108 causes the work memory 110 to store the pre-photographing AF state. Then, in step S515, the CPU 108 sets the movable range of the focus lens 101 to be the range stored in step S506. Next, in step S516, the CPU 108 erases the cancellation icon displayed in step S505.

As described with reference to FIG. 5, in the present embodiment, the CPU 108 selects the movable range of the focus lens 101 according to whether the touch panel 116 is touched. That is, if the touch panel 116 is touched (YES in step S501), the CPU 108 sets the movable range of the focus lens 101 to be the entire range. On the other hand, if the cancellation icon is touched (YES in step S502), the CPU 108 resets the movable range of the focus lens 101 to the initially set movable range thereof. When the CPU 108 fails in setting of the AF frame (NO in step S511) even if the touch panel 116 is touched (YES in step S501), the CPU 108 controls the movable range of the focus lens 101 so as not to be changed.

Figure 6:
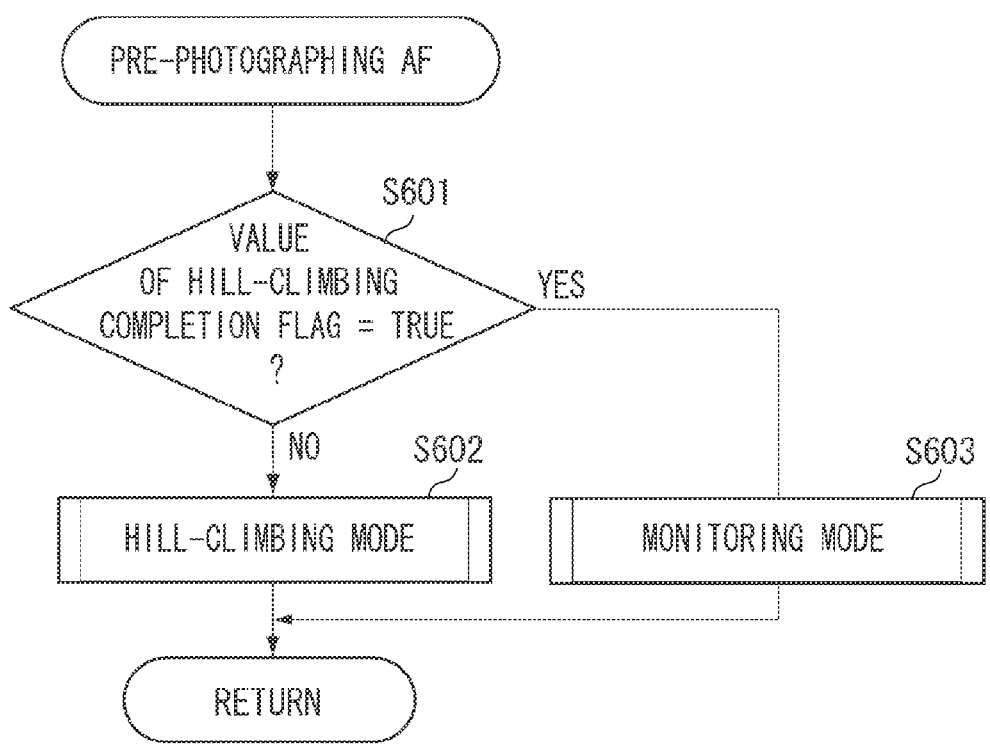
FIG. 6 is a flowchart illustrating a pre-photographing AF process performed in the pre-photographing AF determination process illustrated in FIG. 5.

FIG. 6 is a flowchart illustrating the pre-photographing AF process performed in step S508 illustrated in FIG. 5. In the pre-photographing AF process, it is assumed that hill-climbing AF is performed. An operation illustrated in FIG. 6 is controlled by the system control CPU 108.

First, in step S601, the CPU 108 determines whether the value of a hill-climbing completion flag is "TRUE". If the value of the hill-climbing completion flag is "TRUE" (YES in step S601), the pre-photographing AF process proceeds to step S603. Otherwise (NO in step S601), the process proceeds to step S602. The value of the hill-climbing completion flag is assumed to be preliminarily set to "FALSE" in the initialization processing (not illustrated). In step S602, the CPU 108 performs an AF operation in a hill-climbing mode, which is described below. In step S603, the CPU 108 performs an AF operation in a monitoring mode, which is described below.

Figure 7:
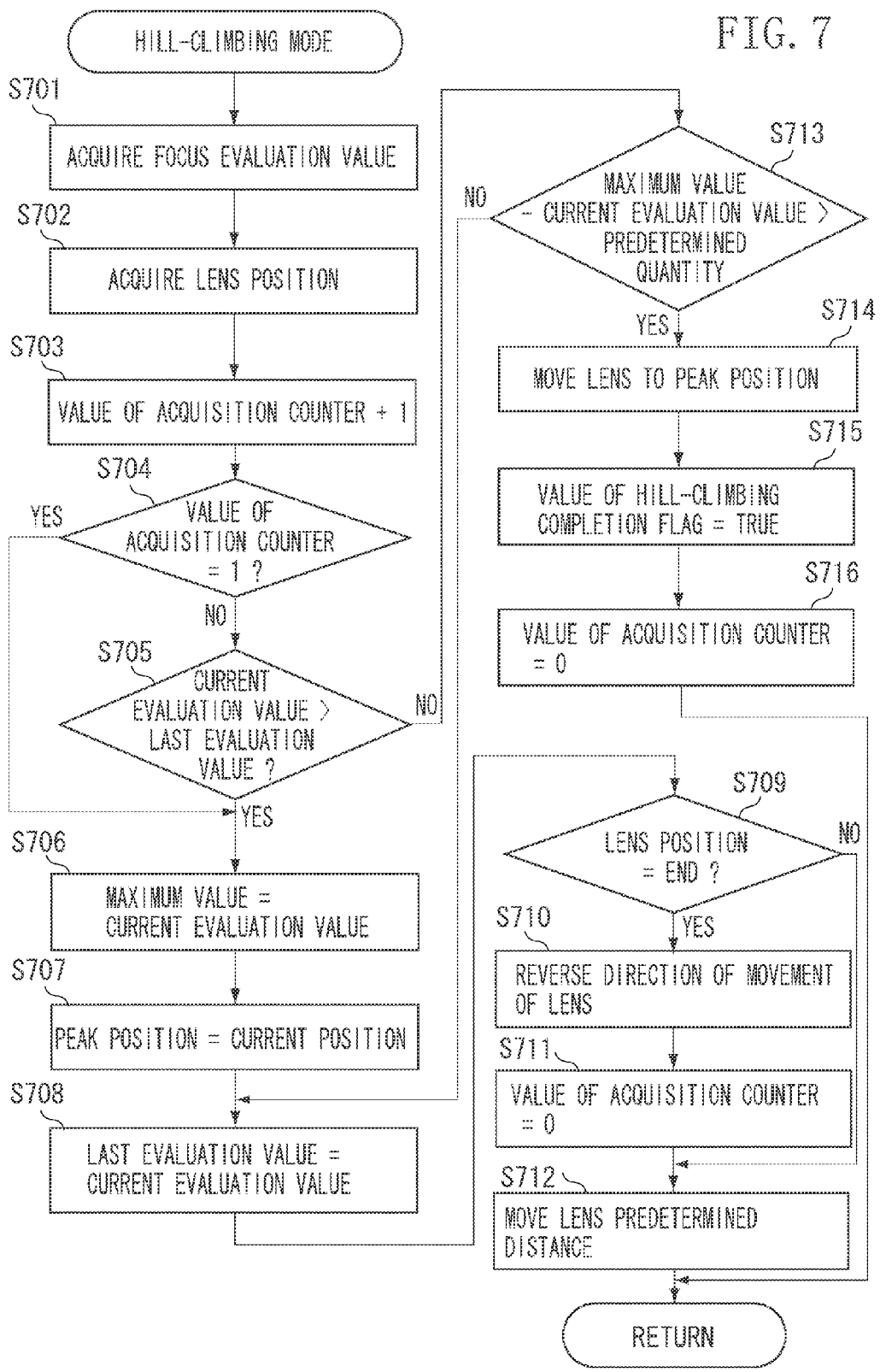
FIG. 7 is a flowchart illustrating a hill-climbing mode process performed in the pre-photographing AF process illustrated in FIG. 6.

FIG. 7 is a flowchart illustrating a hill-climbing mode process performed in step S602 illustrated in FIG. 6. An operation illustrated in FIG. 7 is controlled by the system control CPU 108. First, in step S701, the CPU 108 causes the A/D converter 104 to convert a signal representing a specific frequency band of the luminance of an object, which is an output signal of the image sensor 103, into a digital signal. Then, the CPU 108 causes the A/D converter 104 to supply an output thereof to the image processor 106. Thus, the CPU 108 causes the image processor 106 to extract a high-frequency component of a luminance signal. The CPU 108 causes the work memory 110 to store the extracted high-frequency component as a signal representing a focus evaluation value.

Then, the hill-climbing mode process proceeds to step S702, in which the CPU 108 acquires a current position of the focus lens 101. The CPU 108 causes the work memory 110 to store the acquired current position of the focus lens 101. If a stepping motor is used as the focus lens driving motor 102, the CPU 108 counts the number of driving pulses generated from an initial position (not shown) of the focus lens 101 and sets the counted number as a current position thereof.

Next, the process proceeds to step S703, in which the CPU 108 adds 1 to the value of an acquisition counter. The value of the acquisition counter is assumed to be preliminarily set in the initialization processing (not illustrated) to be 0. Then, in step S704, the CPU 108 determines whether the value of the acquisition counter is 1. If the value of the acquisition counter is 1 (YES in step S704), the process proceeds to step S706. Otherwise (NO in step S704), the process proceeds to step S705.

In step S705, the CPU 108 compares a current focus evaluation value acquired in step S701 with the last focus evaluation value stored in the work memory 110 in step S708, which is described below. If the current focus evaluation value is larger than the last focus evaluation value (YES in step S706), the process proceeds to step S706. Otherwise (NO in step S706), the process proceeds to step S713.

In step S706, the CPU 108 causes the work memory 110 to store the current focus evaluation value as the maximum value of the focus evaluation value. Next, in step S707, the CPU 108 causes the work memory 110 to store the current position of the focus lens 101 as a peak position of the focus evaluation value. In step S708, the CPU 108 causes the work memory 110 to store the current focus evaluation value acquired in step S701 as the last focus evaluation value.

In step S709, the CPU 108 determines whether the current position of the focus lens 101 is located at an end of the movable range of the focus lens 101. If the current position of the focus lens 101 is located at an end of the movable range of the focus lens 101 (YES in step S709), the process proceeds to step S710. Otherwise (NO in step S709), the process proceeds to step S712. If the movable range of the focus lens 101 is set to be the entire range, the end of the movable range of the focus lens 101 is infinity (i.e., the position P1) or the closest position (i.e., the position P3) illustrated in FIG. 4. If the movable range of the focus lens 101 is set to the normal range, the end of the movable range of the focus lens 101 is infinity (i.e., the position P1) or the position P2 illustrated in FIG. 4. On the other hand, if the movable range of the focus lens 101 is set to the macro range, the end of the movable range of the focus lens 101 is the position P2 or the closest position (i.e., the position P3) illustrated in FIG. 4.

In step S710, the CPU 108 reverses the direction of movement of the focus lens 101. In step S711, the CPU 108 sets the value of the acquisition counter to be 0. In step S712, the CPU 108 causes the focus lens 101 to move a predetermined distance.

In step S713, the CPU 108 determines whether "a value obtained by subtracting the current focus evaluation value acquired in step S701 from the maximum value of the focus evaluation value stored in the work memory 110 in step S706" is larger than a predetermined quantity. If the obtained value is larger than the predetermined quantity (YES in step S713), the process proceeds to step S714. Otherwise (NO in step S713), the process proceeds to step S708.

If "the value obtained by subtracting the current focus evaluation value acquired in step S701 from the maximum value of the focus evaluation value stored in the work memory 110 in step S706" is larger than the predetermined quantity (YES in step S713), that is, if the current focus evaluation value decreases from the maximum value by the predetermined quantity (YES in step S713), the CPU 108 regards the maximum value as the value of the focus at the peak position. Then, the process proceeds to step S714. In step S714, the CPU 108 causes the focus lens 101 to move to the peak position of the focus evaluation value stored in the work memory 110. Next, in step S715, the CPU 108 sets the value of the hill-climbing completion flag to be "TRUE". Next, in step S716, the CPU 108 sets the value of the acquisition counter to be 0.

Figure 8:
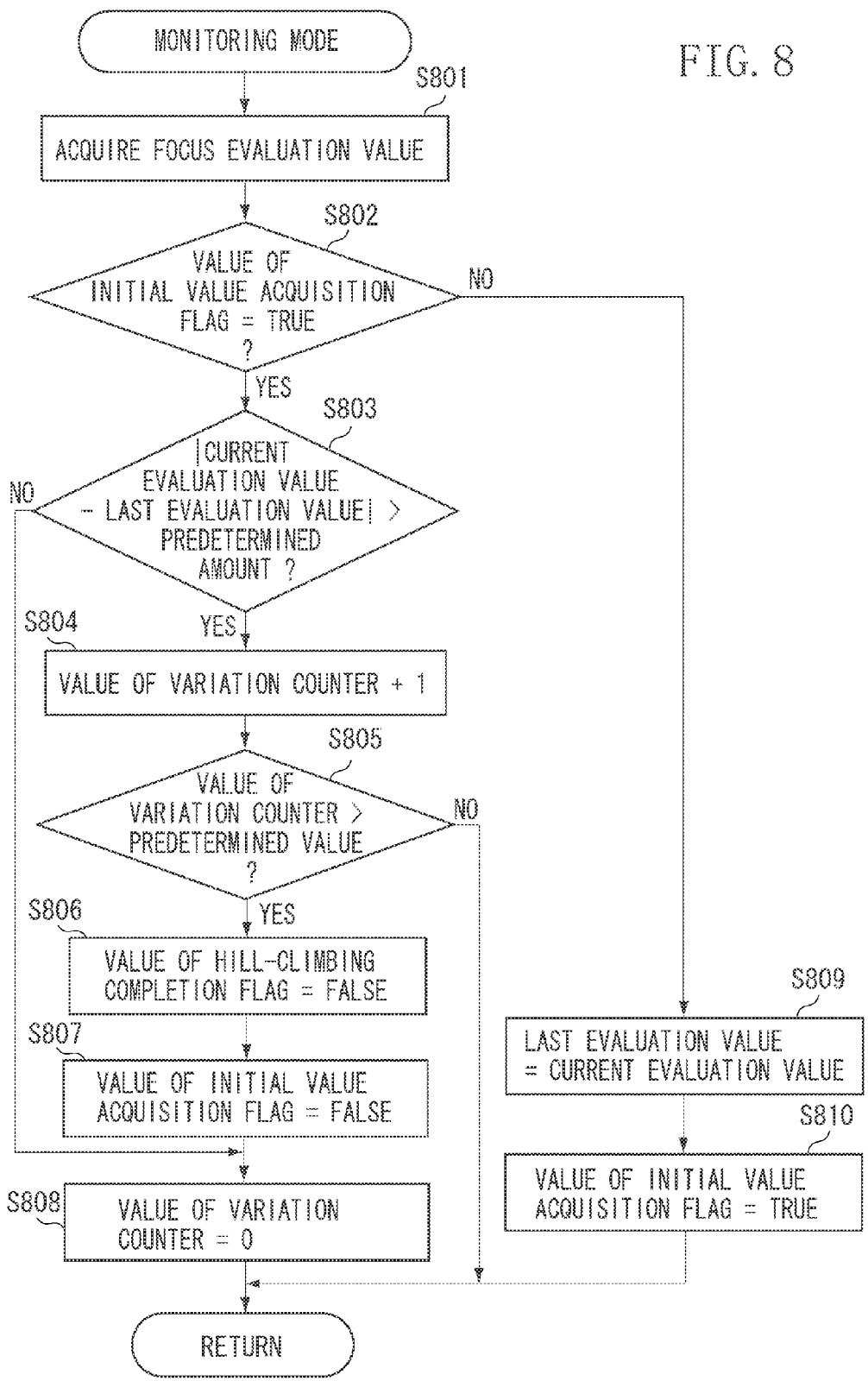
FIG. 8 is a flowchart illustrating a monitoring mode process performed in the pre-photographing AF process illustrated in FIG. 6.

FIG. 8 is a flowchart illustrating an operation in the monitoring mode in step S603 illustrated in FIG. 6. The CPU 108 is configured to acquire, in the monitoring mode, a focus evaluation value without moving the focus lens 101 and to resume hill-climbing when the acquired focus evaluation value changes. An operation illustrated in FIG. 8 is controlled by the system control CPU 108.

First, in step S801, the CPU 108 causes the A/D converter 104 to convert, while the focus lens 101 is fixed to a lens position set to be the peak position, an analog video signal read from the image sensor 103 into a digital signal. Then, the CPU 108 causes the image processor 106 to extract a high-frequency component of a luminance signal from an output of the A/D converter 104. In addition, the CPU 108 causes the work memory 110 to store a value represented by the extracted high-frequency component as a focus evaluation value. Next, in step S802, the CPU 108 checks whether the value of the initial value acquisition flag is "TRUE". If the value of the initial value acquisition flag is "TRUE" (YES in step S802), the monitoring mode process proceeds to step S803. If the value of the initial value acquisition flag is not "TRUE" (NO in step S802), the process proceeds to step S809. The initial value acquisition flag is assumed to be set in the initialization processing (not illustrated) to be "FALSE". In step S803, the CPU 108 determines whether the absolute value of the difference between the current focus evaluation value acquired in step S801 and the last focus evaluation value stored in the work memory 110 in step S809 is larger than a predetermined amount. If the absolute value of the difference is larger than the predetermined amount (YES in step S803), the process proceeds to step S804. Otherwise (NO in step S803), the process proceeds to step S808.

In step S804, the CPU 108 adds 1 to the value of a variation counter. The variation counter is assumed to be preliminarily set in the initialization processing (not illustrated) to be 0. Then, in step S805, the CPU 108 determines whether the value of the variation counter is larger than a predetermined value. If the value of the variation counter is larger than the predetermined value (YES in step S805), the process proceeds to step S806. Otherwise (NO in step S805), the CPU 108 finishes the current process and prepares for the next processing in the monitoring mode.

In step S806, the CPU 108 sets the value of the hill-climbing completion flag to be "FALSE". This setting of the value of the hill-climbing completion flag means that the focus evaluation value varies more greatly than a predetermined value in a predetermined time-period. In addition, this setting thereof means that such variations occur a predetermined number of times. Thus, the CPU 108 determines that the peak position obtained with the AF operation (focusing operation) in the hill-climbing mode is unreliable. In order to resume the AF operation in the hill-climbing mode, the CPU 108 sets the value of the hill-climbing completion flag to be "FALSE". Next, in step S807, the CPU 108 sets the value of the initial value acquisition flag to be "FALSE". Then, in step S808, the CPU 108 sets the value of the variation counter to be 0.

In step S809, the CPU 108 causes the work memory 110 to store, as the last focus evaluation value, the current focus evaluation value obtained after the current focusing. Next, in step S810, the CPU 108 sets the value of the initial value acquisition flag to be "TRUE".

FIG. 9 is a flowchart illustrating an AF frame size setting process performed in step S510 illustrated in FIG. 5. This process is to set an AF frame by determining the position and the size of an object located at a position on the touch panel 116, at which an operator touches. An operation illustrated in FIG. 9 is controlled by the system control CPU 108.

First, in step S901, the CPU 108 sets a determination frame having a minimum size at a position on the screen, which corresponds to a position, at which the operator touches, on the panel. The CPU 108 sets the frame size at that time so that each of the width and the height of the frame is, e.g., 30% of an associated one of the width and the height of the screen. Next, in step S92, the CPU 108 determines the correlation between images in the determination frame set in step S901. The determination of the correlation therebetween is made by comparison between pixel data serving as data representing two images respectively exposed at different times within the determination frame.

Figure 10A:
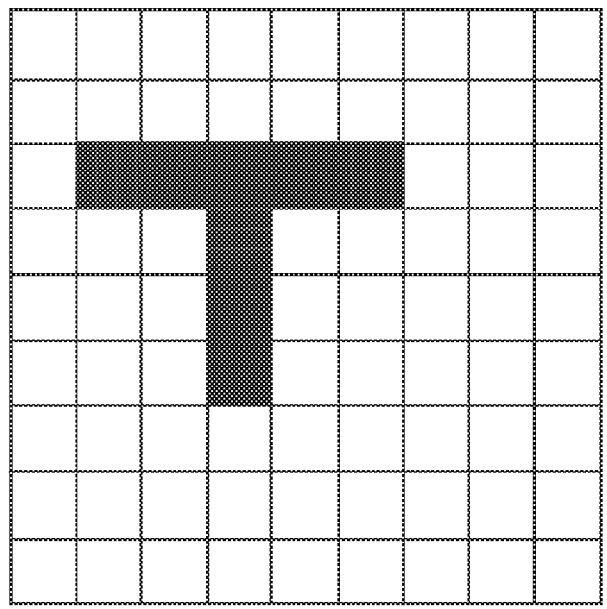
FIGS. 10A and 10B are diagrams illustrating image correlation determination performed in the AF frame size setting process illustrated in FIG. 9.
Figure 10B:
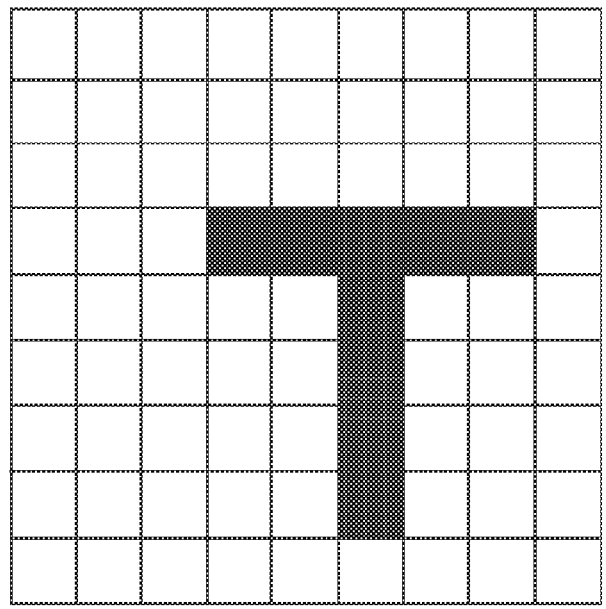

FIGS. 10A and 10B are diagrams illustrating a correlation determination method performed in step S902. FIGS. 10A and 10B illustrate image data representing two images exposed at different points-in-time, respectively. As illustrated in FIGS. 10A and 10B, a letter "T" is shown in each of the images respectively represented by the image data. Each square represents an associated pixel of the image sensor 103. The image represented by the image data illustrated in FIG. 10A differs from that represented by the image data illustrated in FIG. 10B in the position of the letter "T" in each image, for the following reason. That is, the images respectively illustrated in FIGS. 10A and 10B differ from each other at points of time at which the exposure of the image is performed. Thus, the position of the letter "T" in each image is changed due to slight movement of the position of the camera or the photographing object.

The image data illustrated in FIG. 10A is superimposed on the image data illustrated in FIG. 10B. Then, the image data illustrated in FIG. 10B is shifted pixel-by-pixel (corresponding to square-by-square) upward, downward, leftward, and rightward with respect to that illustrated in FIG. 10A. In addition, each time when the image data illustrated in FIG. 10B is shifted by one pixel (corresponding to one square), the difference in pixel value between each pixel of the image obtained by shifting the image data illustrated in FIG. 10B and an associated pixel of the image represented by the image data illustrated in FIG. 10A is calculated. When the position of the letter "T" shifted from that thereof in the image illustrated in FIG. 10B does not coincide with that of the letter "T" in the image illustrated in FIG. 10A, a total-sum of the differences in pixel value therebetween is large. When the position of the letter "T" in the image illustrated in FIG. 10B coincides with that of the letter "T" in the image illustrated in FIG. 10A, a total-sum of the differences in pixel value therebetween is small.

As is understood from comparison between FIGS. 10A and 10B, when the image data illustrated in FIG. 10B is shifted upward two pixels (corresponding to two squares) and leftward two pixels (corresponding to two squares), the position of the letter "T" in an image obtained by shifting the image data coincides with that of the letter "T" in the image illustrated in FIG. 10A. Thus, the CPU 108 determines that the correlation between both of the two images is obtained if a total-sum of the differences in pixel value therebetween is smaller than a predetermined value when the image data representing one of the two images is shifted pixel-by-pixel (corresponding to square-by-square) to a specific position in which the shifted image data is matched with the image data representing the other image and if a total-sum of the differences in pixel value therebetween is larger than the predetermined value when the one of the two images is in other positions. On the other hand, the CPU 108 determines that the correlation between both of the two images is not obtained if the images are low in contrast, e.g., the images are only white in color so that no matter how the images are shifted from each other, a total sum of the differences in pixel value is small.

In step S903, the CPU 108 determines, based on a result of the determination in step S902, whether the correlation is obtained. If the correlation is obtained (YES in step S903), the process proceeds to step S904. Otherwise (NO in step S903), the process proceeds to step S906. In step S904, the CPU 108 sets the position and the size of the AF frame to those of the determination frame, respectively. Next, in step S905, the CPU 108 determines that the AF frame is successfully set. In addition, the CPU 108 causes the work memory 110 to store information representing the success in setting the AF frame.

In step S906, the CPU 108 determines whether the size of the current determination frame is maximum. If the size of the current determination frame is maximum (YES in step S906), the process proceeds to step S907. Otherwise (NO in step S906), the CPU 108 proceeds to step S908. The maximum size is set so that each of the width and the height of the determination frame, e.g., 50% of an associated one of the width and the height of the screen. In step S907, the CPU 108 determines that failure in setting the AF frame occurs. In step S908, the CPU 108 increases the size of the determination frame to the next larger size. When the current size of the determination frame is such that each of the width and the height thereof is 30% of an associated one of the width and the height of the screen, the next larger size of the determination frame is assumed such that each of the width and the height thereof is 40% of an associated one of the width and the height of the screen.

Figure 11:
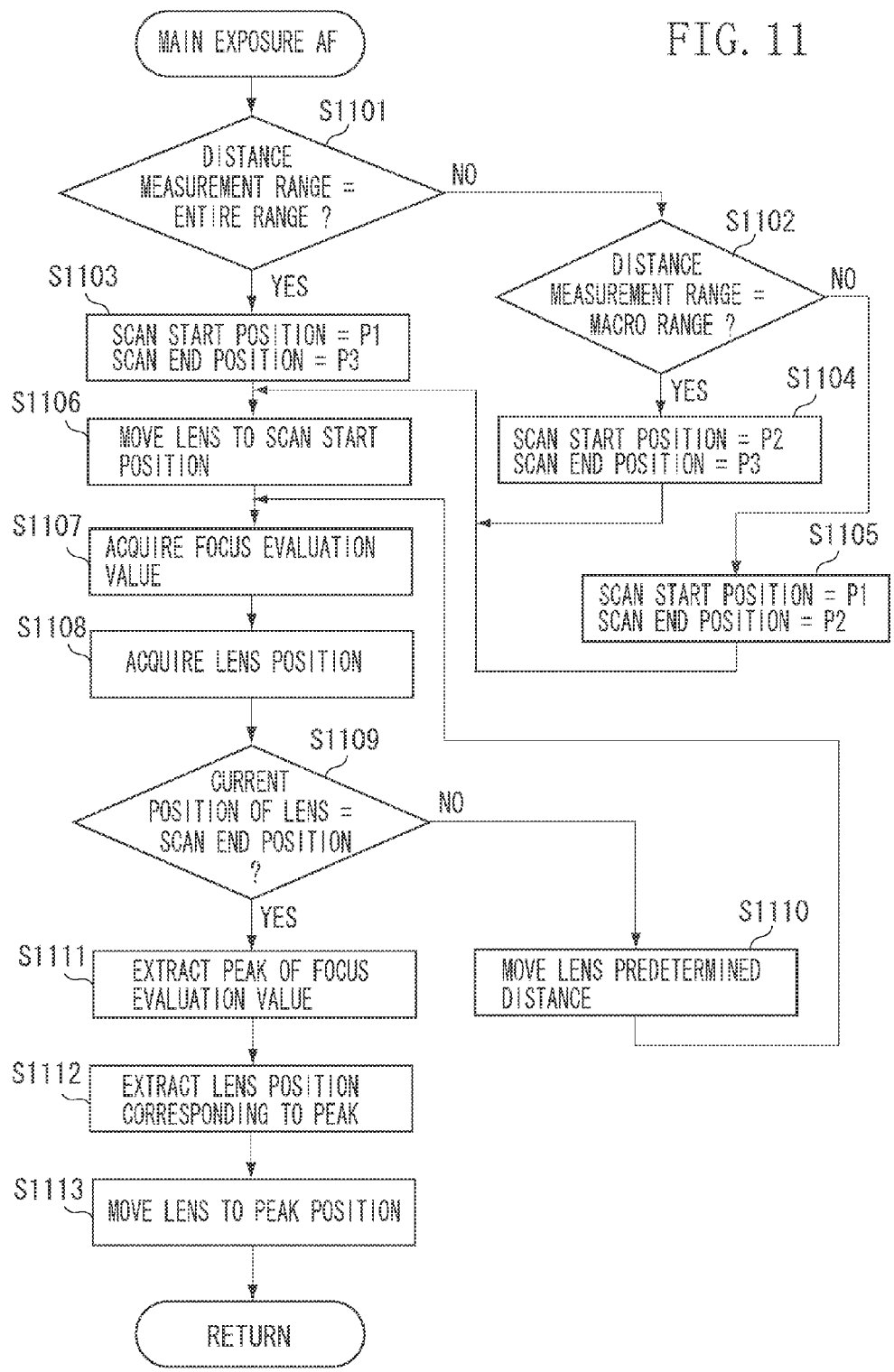
FIG. 11 is a flowchart illustrating a main exposure AF operation performed in the fundamental operation illustrated in FIG. 2.

FIG. 11 is a flowchart illustrating a main exposure AF operation in step S207 illustrated in FIG. 2. The operation illustrated in FIG. 11 is controlled by the system control CPU 108.

First, in step S1101, the CPU 108 determines whether the movable range of the focus lens 101 is set to be the entire range. If the movable range of the focus lens 101 is set to be the entire range (YES in step S1101), a process of performing the operation proceeds to step S1103. Otherwise (NO in step S1101), the process proceeds to step S1102. The movable range of the focus lens 101 is set in steps S304 and S305 illustrated in FIG. 3 and in steps S507 and S515 illustrated in FIG. 5. In step S1102, the CPU 108 determines whether the movable range of the focus lens 101 is set to the macro range. If the movable range of the focus lens 101 is set to the macro range (YES in step S1102), the process proceeds to step S1104. Otherwise (NO in step S1102), the process proceeds to step S1105.

In step S1103, the CPU 108 sets a scan start position at which the focus lens 101 starts scanning for acquiring a focus evaluation value, and a scan end position at which the focus lens 101 ends the scanning, to positions P1 and P3, respectively. In step S1104, the CPU 108 sets the scan start position and the scan end position to positions P2 and P3, respectively. In step S1105, the CPU 108 sets the scan start position and the scan end position to positions P1 and P2, respectively. FIG. 4 illustrates the positional relationship among the positions P1, P2, and P3. If the processing in one of steps S1103 through S1105 is finished, the process proceeds to step S1106.

In step S1106, the CPU 108 causes the focus lens 101 to move to the scan start position set in step S1103, S1104, or S1105. Next, in step S1107, the CPU 108 causes the A/D converter 104 to convert into a digital signal an analog video signal read from the image sensor 103. Then, the CPU 108 causes the image processor 106 to extract a high-frequency component of a luminance signal from an output of the A/D converter 104. Next, the CPU 108 causes the work memory 110 to store a value represented by the extracted component as a focus evaluation value.

Next, in step S1108, the CPU 108 acquires the current position of the focus lens 101. Then, the CPU 108 causes the work memory 110 to store the acquired current position of the focus lens 101. If a stepping motor is used as the focus lens driving motor 102, the CPU 108 counts the number of driving pulses generated from the initial position (not shown) and sets the counted number as a current position of the focus lens 101. Next, in step S1109, the CPU 108 checks whether the current position of the focus lens 101, which is acquired in step S1108, is the same as the scan end position set in step S1103, S1104, or S1105. If the current position of the focus lens 101 is the same as the scan end position (YES in step S1109), the process proceeds to step S1111. Otherwise (NO in step S1109), the process proceeds to step S1110. In step S1110, the CPU 108 causes the focus lens 101 to move towards the scan end position by a predetermined distance.

In step S1111, the CPU 108 extracts, from the focus evaluation values acquired in step S1107, a maximum focus evaluation value, i.e., a peak of the focus evaluation value. Next, in step S1112, the CPU 108 extracts, from the positions of the focus lens 101 acquired in step S1108, a position of the focus lens 101 corresponding to the peak of the focus evaluation value extracted in step S1111, i.e., the position of the lens 101 corresponding to the peak. In step S1113, the CPU 108 causes the focus lens 101 to move to the position of the peak extracted in step S1112.

Thus, an operation more reflecting an operator's intention can be performed by selecting the movable range of the focus lens 101 according to whether the touch panel 116 is touched. That is, because an object to focus on is definitely identified by an operator's touching of the touch panel 116, an AF frame suited for the object can be set. Accordingly, the present exemplary embodiment can reduce what is called perspective conflict that is an erroneous distance measurement caused by a condition in which both of a far object and a near object are present in an AF frame. In addition, an AF operation can be performed over a wide movable range of a focus lens without concern for perspective conflict.

On the other hand, if the touch panel 116 is not touched, an object to focus on is not definitely identified. Thus, the movable range of the focus lens is divided into the normal range and the macro range. Accordingly, even when both of a far object and a near object are present in an AF frame, the perspective conflict can be prevented by limiting the movable range of the focus lens. Consequently, erroneous distance measurement can be reduced.

In the above exemplary embodiment, the movable range of the focus lens 101 is selected according to whether the touch panel 116 is touched. When the touch panel 116 is touched, the camera is configured such that the position of an object is designated by an operator, and that the AF frame for detecting a focal point is set. When the touch panel 116 is not touched, the camera is configured such that an object is not designated by an operator, and that the AF frame is automatically set under the control of the system control CPU 108. However, an imaging apparatus according to the present invention is not limited thereto. For example, the touch panel 116 can be omitted from the imaging apparatus according to the present invention. In this case, the imaging apparatus according to the present invention can be configured as follows. That is, a cursor is displayed on the screen of the image display unit 115. When an operator operates an operation member, such as an arrow key, a button, or a dial, the system control CPU 108 receives the operation performed on the operation member by the operator. According to an instruction issued by the operator, the position of the cursor is moved. When an instruction to determine the position of the AF frame is issued by the operator, the AF frame is set at the position designated by the instruction. It is sufficient that the cursor displayed on the screen of the image display unit 115 indicates the designated position with, e.g., a cross-like or rectangular figure.

More specifically, in step S501 illustrated in FIG. 5, the CPU 108 determines whether the operation member such as an arrow key, a button, or a dial, is operated. If the operation member is operated (YES in step S501), the pre-photographing AF determination process proceeds to step S502. Otherwise (NO in step S501), the CPU 108 finishes the present process. In step S502, the CPU 108 determines whether the operator performs a cancellation operation to issue a cancellation instruction. If the operator performs a cancellation operation (YES in step S502), the process proceeds to step S513. Otherwise (NO in step S502), the process proceeds to step S503. In step S503, the CPU 108 determines whether a face is displayed at the position of the cursor on the screen of the image display unit 115 when the position of an object is determined by operating the operation member in step S501. Whether a face is displayed thereat is determined by the CPU 108, based on the position and the size of the face detected by the face detection portion 114 from the image processed by the image processor 106. If it is found, as a result of the determination in step S503, that a face is displayed thereat (YES in step S503), the process proceeds to step S504. If no face is displayed at the position corresponding to the position of the object determined by operating the operation member (NO in step S503), the process proceeds to step S510 to set the position and the size of the AF frame based on the degree of the correlation between the object images respectively photographed at the positions at different times. Accordingly, the movable range of the focus lens 101 at a time, at which the position of the object is designated with the cursor on the display screen, can be changed from that of the focus lens 101 at a time at which the position of the object is not designated.

In step S504, the CPU 108 sets the AF frame whose position and size respectively correspond to those of the face displayed at the position designated in step S501. Simultaneously with the setting of the AF frame, the CPU 108 causes the image display unit 115 to display an icon (frame) whose position and size respectively correspond to those of the face. Then, processing in steps S505 through S516 is performed, similar to that described above with reference to FIG. 5.

The present invention can be implemented by performing the following processing. That is, software (computer program) implementing the functions of the above exemplary embodiment is supplied to a system or an apparatus via a computer-readable storage medium. Then, a computer (or CPU or microprocessor unit (MPU)) of the system or apparatus reads and executes the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An apparatus comprising:
a focus detection unit configured to detect a focusing state of light from an object incident thereon via a focus lens so that an object-image is in focus on an imaging unit;
a control unit configured to move the focus lens when the focusing state is detected;
a designation unit configured to receive a designation of an in-screen position of an object displayed on a display screen; and
an object detection unit configured to detect a specific object based on an output signal of the imaging unit;
wherein the control unit performs AF frame setting processing which sets area which detects focusing state based on the designated specific object when the specific object is detected by the object detection unit to a position in the display screen designated by the designation unit, and AF frame setting processing which sets area which detects the focusing state based on correlation of at least two output signals output from the imaging unit at different time to a position in the display screen designated by the designation unit when the specific object is not detected by the object detection unit to a position in the display screen designated by the designation unit.

2. The apparatus according to claim 1, further comprising movable range selecting unit configured to set the movable range of the focus lens to first range limited to a part of focusable range;
wherein, when correlation of at least two output signals cannot be obtained, the movable range of the focus lens is set to the first range; and
wherein, when correlation of at least two output signals is obtained, the movable range of the focus lens is set to second range which is larger than the first range.

3. A method comprising:
detecting a focusing state of light from an object incident thereon via a focus lens so that an object-image is in focus on an imaging unit;
moving the focus lens when the focusing state is detected;
receiving a designation of an in-screen position of an object displayed on a display screen;
detecting a specific object based on an output signal of the imaging unit; and
performing AF frame setting processing which sets area which detects focusing state based on the designated specific object when the specific object is detected to a position in the designated display screen, and AF frame setting processing which sets area which detects the focusing state based on correlation of at least two output signals output from the imaging unit at different time to a position in the designated display screen when the specific object is not detected to a position in the designated display screen.

4. The method according to claim 3, further comprising setting the movable range of the focus lens to first range limited to a part of focusable range;
wherein, when correlation of at least two output signals cannot be obtained, the movable range of the focus lens is set to the first range; and
wherein, when correlation of at least two output signals is obtained, the movable range of the focus lens is set to second range which is larger than the first range.

* * * * *